US012130641B2

(12) United States Patent
Li

(10) Patent No.: US 12,130,641 B2
(45) Date of Patent: Oct. 29, 2024

(54) METHOD, APPARATUS AND UNMANNED AERIAL VEHICLE FOR PROCESSING DEPTH MAP

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 657 days.

(21) Appl. No.: 17/361,694

(22) Filed: Jun. 29, 2021

(65) Prior Publication Data
US 2021/0325909 A1 Oct. 21, 2021

Related U.S. Application Data

(63) Continuation of application No. PCT/CN2019/129562, filed on Dec. 28, 2019.

(30) Foreign Application Priority Data

Dec. 29, 2018 (CN) .......................... 201811634006.9

(51) Int. Cl.
G06T 7/593 (2017.01)
B64C 39/02 (2023.01)
(Continued)

(52) U.S. Cl.
CPC ............ G05D 1/106 (2019.05); B64C 39/024 (2013.01); B64D 47/08 (2013.01); G06T 7/593 (2017.01);
(Continued)

(58) Field of Classification Search
CPC ...... B64C 39/024; B64D 47/08; B64U 20/87; B64U 2101/30; G01C 11/04; G05D 1/106;
(Continued)

(56) References Cited

U.S. PATENT DOCUMENTS

2014/0337848 A1 11/2014 Llamas et al.
2017/0353708 A1 12/2017 Petrichkovich et al.
(Continued)

FOREIGN PATENT DOCUMENTS

CN 106358003 A 1/2017
CN 106384382 A 2/2017
(Continued)

OTHER PUBLICATIONS

Su Dong; "Navigation and obstacle avoidance for miniature UAV based on binocular stereo vision", A Master Thesis submitted to University of Electronic and Science of China; May 26, 2014; 24 pages.
(Continued)

Primary Examiner — Charles J Han

(57) ABSTRACT

The method for processing a depth map includes the following steps: S1: correcting an image of a target area that is collected by an image collection apparatus; S2: performing binocular matching on the image to obtain a depth map of the target area; and S3: acquiring a distribution of obstacles around an UAV according to the depth map. The method further includes: acquiring execution times of the foregoing steps before executing the steps; and establishing at least two threads and at least one ring queue according to the execution times of the steps, and executing the steps by the at least two threads to reduce a total execution time.

20 Claims, 4 Drawing Sheets

(51) Int. Cl.
  *B64D 47/08* (2006.01)
  *B64U 101/30* (2023.01)
  *G05D 1/00* (2024.01)
(52) U.S. Cl.
  CPC ............... *B64U 2101/30* (2023.01); *G06T 2207/30261* (2013.01)
(58) Field of Classification Search
  CPC ............ G06T 1/20; G06T 2207/10021; G06T 2207/10028; G06T 2207/10032; G06T 2207/30261; G06T 7/55; G06T 7/593; G06T 7/73
  See application file for complete search history.

(56) References Cited

U.S. PATENT DOCUMENTS

| | | | |
|---|---|---|---|
| 2018/0081734 A1 | 3/2018 | Nandan et al. | |
| 2018/0365074 A1* | 12/2018 | Necas | G06F 9/5038 |

FOREIGN PATENT DOCUMENTS

| | | | |
|---|---|---|---|
| CN | 107703951 A | | 2/2018 |
| CN | 108594851 A | * | 9/2018 |
| CN | 108733344 A | | 11/2018 |
| CN | 109034018 A | | 12/2018 |
| CN | 109631853 A | | 4/2019 |
| WO | 2011/075368 A1 | | 6/2011 |

OTHER PUBLICATIONS

International Search Report mailed Mar. 27, 2020; PCT/CN2019/129562.

First Chinese Office Action dated Feb. 25, 2020; Appln. No. 201811634006.9.

Extended European Search Report dated Apr. 1, 2022; Appln. No. 19905206.9.

* cited by examiner

METHOD, APPARATUS AND UNMANNED AERIAL VEHICLE FOR PROCESSING DEPTH MAP

CROSS REFERENCE

This application is a continuation of International Application No. PCT/CN2019/129562, filed on Dec. 28, 2019, which claims priority to Chinese Patent Application No. 2018116340069 filed on Dec. 29, 2018, which is incorporated herein by reference in its entirety.

BACKGROUND

Technical Field

Embodiments of the present invention relate to the technical field of unmanned aerial vehicles (UAV), and in particular, to a method, apparatus and UAV for processing a depth map.

Related Art

During an autonomous flight, the UAV needs to avoid obstacles. Therefore, it is necessary to detect positions of the obstacles, so that the UAV can take obstacle avoidance measures according to the positions of the obstacles. At present, the UAV mostly adopts a vision system (such as a monocular vision system, a binocular vision system, etc.) for obstacle position detection, which uses a camera apparatus to take images of an area surrounding the UAV and processes the images to determine location information of surrounding obstacles. Then, the UAV takes obstacle avoidance measures such as detour, deceleration or pause according to its own speed, posture and the location information of the obstacles to avoid the obstacles.

During implementation of the present invention, the inventor finds that there are at least the following problems in the related art: when the UAV performs image processing and performs obstacle avoidance measures according to processing results, if a frame rate of image collection is relatively high, it is likely to cause image processing blockage, thus causing a large delay.

SUMMARY

An objective of embodiments of the present invention is to provide a method, apparatus and UAV for processing a depth map, which can alleviate the problem of image processing blockage and a large delay during using a vision system on the UAV.

In a first aspect, an embodiment of the present invention provides a method for processing a depth map, applicable to a controller of the UAV. The UAV further includes an image collection apparatus, the image collection apparatus being communicatively connected to the controller. The method includes the following steps:

S1: correcting an image of a target area that is collected by the image collection apparatus;
S2: performing binocular matching on the image to obtain a depth map of the target area; and
S3: acquiring a distribution of obstacles around the UAV according to the depth map; and
the method further includes:
acquiring an execution time of step S1, an execution time of step S2 and an execution time of step S3 before executing step S1, step S2 and step S3; and
establishing at least two threads and at least one ring queue according to the execution time of step S1, the execution time of step S2 and the execution time of step S3, and executing step S1, step S2 and step S3 by the at least two threads to reduce a total execution time, where
of two of the at least two threads that execute adjacent ones of the steps, a processing result from a thread executing a former step is transmitted to the ring queue, and a thread executing a latter step fetches the processing result from the ring queue and executes the latter step according to the processing result.

In some embodiments, the establishing at least two threads and at least one ring queue according to the execution time of step S1, the execution time of step S2 and the execution time of step S3, and executing step S1, step S2 and step S3 by the at least two threads to reduce a total execution time includes:

determining whether a sum of the execution time of step S1, the execution time of step S2 and the execution time of step S3 meets a first preset condition; and
establishing a first thread, a second thread and a first ring queue, and executing step S1, step S2 and step S3 by the first thread and the second thread if the sum of the execution time of step S1, the execution time of step S2 and the execution time of step S3 meets the first preset condition, where
of the first thread and the second thread, a processing result from a thread executing a former step is transmitted to the first ring queue, and a thread executing a latter step fetches the processing result from the first ring queue and executes the latter step according to the processing result.

In some embodiments, the first preset condition is that:
the sum of the execution time of step S1, the execution time of step S2 and the execution time of step S3 is greater than a preset value.

In some embodiments, the preset value is 1000/P, P being an image frame rate.

In some embodiments, the first thread executes two of step S1, step S2 and step S3, and the second thread executes one of step S1, step S2 and step S3; and
the establishing a first thread, a second thread and a first ring queue, and executing step S1, step S2 and step S3 by the first thread and the second thread if the sum of the execution time of step S1, the execution time of step S2 and the execution time of step S3 meets the first preset condition includes:
determining whether a sum of the execution times of the two steps executed by the first thread meets a second preset condition; and
if so, establishing a third thread and a second ring queue, and executing the two steps respectively by the first thread and the third thread, where
of the first thread and the third thread, a processing result from a thread executing a former step is transmitted to the second ring queue, and a thread executing a latter step fetches the processing result from the second ring queue and executes the latter step according to the processing result.

In some embodiments, the second preset condition is that a sum of the execution times of the two steps executed by the first thread is greater than a preset value.

In some embodiments, the preset value is 1000/P, P being an image frame rate.

In some embodiments, the controller includes a hardware acceleration channel, and the image collection apparatus includes at least two sets of binocular units; and the performing binocular matching on the image to obtain a depth map of the target area includes:

transmitting images collected by the at least two sets of binocular units to the hardware acceleration channel, and performing, by performing time division multiplexing on the hardware acceleration channel, binocular matching on the images collected by the at least two sets of binocular units, to obtain the depth map.

In some embodiments, the hardware acceleration channel includes at least two hardware acceleration channels, and the images collected by the at least two sets of binocular units include a set of images having a first resolution and a set of images having a second resolution, the second resolution being greater than the first resolution; and the performing binocular matching on the image to obtain a depth map of the target area includes:

transmitting the set of images having the second resolution to one of the at least two hardware acceleration channels for binocular matching, so as to obtain a depth map corresponding to the set of images; and transmitting the set of images having the first resolution to the other of the at least two hardware acceleration channels for binocular matching, so as to obtain a depth map corresponding to the set of images.

In some embodiments, the hardware acceleration channel includes four hardware acceleration channels, i.e., a first hardware acceleration channel, a second hardware acceleration channel, a third hardware acceleration channel and a fourth hardware acceleration channel, respectively;

the image collection apparatus includes six sets of binocular units, a set of images collected by four of the six sets of binocular units being the set of images having the first resolution, and a set of images collected by two of the six sets of binocular units being the set of images having the second resolution;

the transmitting the set of images having the first resolution to the other of the at least two hardware acceleration channels for binocular matching, so as to obtain a depth map corresponding to the set of images includes:

transmitting the set of images collected by the two sets of binocular units respectively to the first hardware acceleration channel and the second hardware acceleration channel; and the transmitting the set of images having the second resolution to one of the at least two hardware acceleration channels for binocular matching, so as to obtain a depth map corresponding to the set of images includes:

transmitting a set of images collected by two of the four sets of binocular units to the third hardware acceleration channel, and transmitting a set of images collected by the remaining two of the four sets of binocular units to the fourth hardware acceleration channel.

In a second aspect, an embodiment of the present invention provides an apparatus for processing a depth map, applicable to a controller of the UAV. The UAV further includes an image collection apparatus, the image collection apparatus being communicatively connected to the controller. The apparatus includes:

a processor, configured to: execute step S1 of correcting an image of a target area that is collected by the image collection apparatus;

execute step S2 of performing binocular matching on the image to obtain a depth map of the target area; and execute step S3 of acquiring a distribution of obstacles around the UAV according to the depth map.

The apparatus further includes:

a processor, configured to: acquire an execution time of step S1, an execution time of step S2 and an execution time of step S3 before the execution of step S1, step S2 and step S3; and establish at least two threads and at least one ring queue according to the execution time of step S1, the execution time of step S2 and the execution time of step S3, and execute step S1, step S2 and step S3 by the at least two threads to reduce a total execution time, where of two of the at least two threads that execute adjacent ones of the steps, a processing result from a thread executing a former step is transmitted to the ring queue, and a thread executing a latter step fetches the processing result from the ring queue and executes the latter step according to the processing result.

In some embodiments, the thread and ring queue establishing module includes:

a determination submodule, configured to determine whether a sum of the execution time of step S1, the execution time of step S2 and the execution time of step S3 meets a first preset condition; and a thread and ring queue establishing submodule, configured to establish a first thread, a second thread and a first ring queue, and execute step S1, step S2 and step S3 by the first thread and the second thread if the sum of the execution time of step S1, the execution time of step S2 and the execution time of step S3 meets a first preset condition, where of the first thread and the second thread, a processing result from a thread executing a former step is transmitted to the first ring queue, and a thread executing a latter step fetches the processing result from the first ring queue and executes the latter step according to the processing result.

In some embodiments, the first preset condition is that: the sum of the execution time of step S1, the execution time of step S2 and the execution time of step S3 is greater than a preset value.

In some embodiments, the preset value is 1000/P, P being an image frame rate.

In some embodiments, the first thread executes two of step S1, step S2 and step S3, and the second thread executes one of step S1, step S2 and step S3; and the thread and ring queue establishing submodule is further configured to:

determine whether a sum of the execution times of the two steps executed by the first thread meets a second preset condition; and if so, establish a third thread and a second ring queue, and executing the two steps respectively by the first thread and the third thread, where of the first thread and the third thread, a processing result from a thread executing a former step is transmitted to the second ring queue, and a thread executing a latter step fetches the processing result from the second ring queue and executes the latter step according to the processing result.

In some embodiments, the second preset condition is that a sum of the execution times of the two steps executed by the first thread is greater than a preset value.

In some embodiments, the preset value is 1000/P, P being an image frame rate.

In some embodiments, the controller includes a hardware acceleration channel, and the image collection apparatus includes at least two sets of binocular units; and
the depth map acquisition module is further configured to:
transmit images collected by the at least two sets of binocular units to the hardware acceleration channel, and perform, by performing time division multiplexing on the hardware acceleration channel, binocular matching on the images collected by the at least two sets of binocular units, to obtain the depth map.

In some embodiments, the hardware acceleration channel includes at least two hardware acceleration channels, and the images collected by the at least two sets of binocular units include a set of images having a first resolution and a set of images having a second resolution, the second resolution being greater than the first resolution; and
the depth map acquisition module is further configured to:
transmit the set of images having the second resolution to one of the at least two hardware acceleration channels for binocular matching, so as to obtain a depth map corresponding to the set of images; and
transmit the set of images having the first resolution to the other of the at least two hardware acceleration channels for binocular matching, so as to obtain a depth map corresponding to the set of images.

In some embodiments, the hardware acceleration channel includes four hardware acceleration channels, i.e., a first hardware acceleration channel, a second hardware acceleration channel, a third hardware acceleration channel and a fourth hardware acceleration channel, respectively;
the image collection apparatus includes six sets of binocular units, a set of images collected by four of the six sets of binocular units being the set of images having the first resolution, and a set of images collected by two of the six sets of binocular units being the set of images having the second resolution;
the depth map acquisition module is further configured to:
transmit the set of images collected by the two sets of binocular units respectively to the first hardware acceleration channel and the second hardware acceleration channel; and
transmit a set of images collected by two of the four sets of binocular units to the third hardware acceleration channel, and transmit a set of images collected by the remaining two of the four sets of binocular units to the fourth hardware acceleration channel.

In a third aspect, an embodiment of the present invention provides a UAV. The UAV includes:
a fuselage;
a wing connected to the fuselage;
a power apparatus, disposed on the wing;
an image collection apparatus disposed on the fuselage, the image collection apparatus being configured to acquire a target image of a target area of the UAV; and
a vision chip disposed in the fuselage, the vision chip being communicatively connected to the image collection apparatus, where
the vision chip includes:
at least one processor; and
a memory, communicatively connected to the at least one processor, the memory storing instructions executable by the at least one processor, the instructions, when being executed by the at least one processor, causing the at least one processor to perform the method.

In a fourth aspect, an embodiment of the present invention provides a non-volatile computer-readable storage medium, the computer-readable storage medium storing computer executable instructions which, when executed by a UAV, cause the UAV to execute the foregoing method.

According to the method, apparatus and UAV for processing a depth map of the embodiments of the present invention, at least two threads and at least one ring queue are established according to the execution times of all steps during depth map processing by the controller of the UAV, and the at least two threads execute all of the steps for method of processing the depth map. Each of the threads can obtain processing results from other threads through the at least one ring queue. Through the mode of the ring queue and parallel multi-thread running, the problem of image processing blockage is solved, and a delay is reduced.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of this application without creative efforts shall fall within the protection scope of this application.

Figure 1:
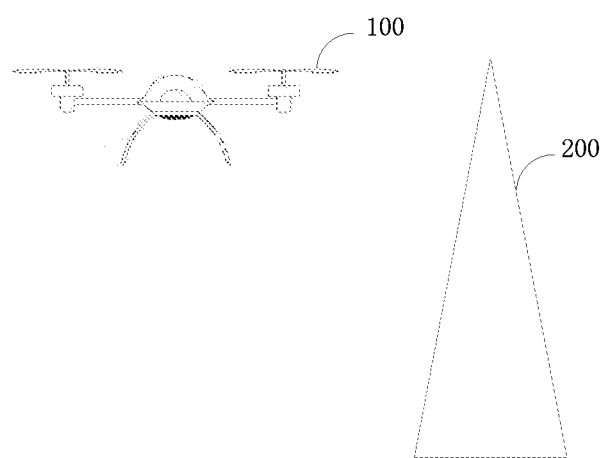
FIG. 1 is a schematic diagram of an application scenario of a method and apparatus for processing a depth map according to an embodiment of the present invention.

A method, apparatus and UAV for processing a depth map provided in embodiments of the present invention are applicable to an application scenario shown in FIG. 1. The application scenario includes a UAV 100 and an obstacle 200. The UAV 100 may be a suitable UAV, including a fixed-wing UAV and a rotary-wing UAV, such as a helicopter, a quadrotor and an aircraft with other numbers of rotors and/or rotor configuration. The UAV 100 may further be other movable objects, such as a manned aircraft, a model airplane, an unmanned airship and an unmanned hot air balloon. The obstacle 200 may be, for example, a building, a mountain, a tree, a forest, a signal tower or other movable or non-movable objects (only one obstacle is shown in FIG. 1, there may be more obstacles or no obstacle in actual application).

Figure 2:
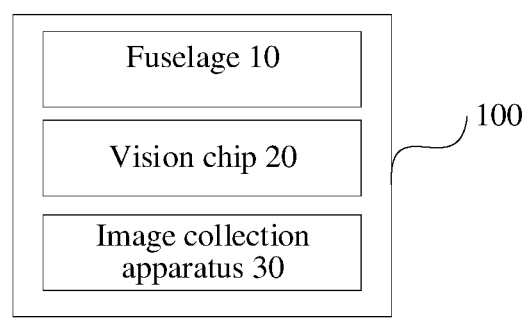
FIG. 2 is a schematic structural diagram of hardware of an embodiment of a UAV according to the present invention.

In some embodiments, referring to FIG. 2 (FIG. 2 only shows a part of the composition of the UAV 100). The UAV 100 includes a fuselage 10, a wing connected to the fuselage 10, a power apparatus and a control system disposed on the fuselage 10. The power apparatus is configured to provide push force or lift force for the UAV 10 to fly. The control system is a central nervous system of the UAV 100 and may include a plurality of functional units, such as a flight control system, a vision system and other systems with specific functions. The vision system includes an image collection apparatus 30 and a vision chip 20, and the flight control system includes various sensors (such as a gyroscope and an accelerometer) and a flight control chip.

During autonomous flight, the UAV 100 needs to recognize and avoid the obstacle 200 in front by itself. The UAV 100 may detect location information of obstacles around the UAV 100 through the image collection apparatus 30 and the vision chip 20, and take obstacle avoidance measures according to the location information.

The image collection apparatus 30 is configured to acquire a target image of the target area, and may adopt, for example, a high-definition camera, a sport camera or the like. The vision chip 20 is communicatively connected to the image collection apparatus 30, may acquire the target image collected by the image collection apparatus 30, and perform image processing on the target image to obtain depth information of a corresponding area of the target image, thereby obtaining location information of the obstacle 200 around the UAV 100. The vision chip 20 can take obstacle avoidance measures according to the location information of the obstacle 200. The flight control chip controls the UAV 100 according to the obstacle avoidance measures. The obstacle avoidance measures include controlling the UAV to slow down, pause or the like. The vision chip 20 may further determine a distance of an obstacle and perform three-dimensional reconstruction according to the location information of the obstacle 200.

The image collection apparatus 30 may include at least one monocular unit or at least one binocular unit (the binocular unit is used as an example for description below). Each binocular unit may obtain a set of target images, and each binocular unit collects the target images at a preset frame rate. The vision chip 20 needs to perform image processing on sets of target images obtained by the binocular units to obtain depth information corresponding to each of the sets of target images. The vision chip 20 also needs to obtain a distribution of obstacles 200 around the UAV 100 according to the depth information corresponding to each of the sets of target images. When the frame rate at which the target images are collected is relatively high, it may cause incapability of processing by the vision chip 20, which in turn hampers the processing of the sets of target images of an inputted source, causing image processing blockage and a large delay.

In order to solve the problem of image processing blockage and the large delay, in the embodiments of the present invention, at least two threads and at least one ring queue may be established according to the execution times of all steps during depth map processing by the controller of the UAV, and when a sum of the execution times of all steps is relatively large, the at least two threads execute all of the steps for processing the depth map. Each of the threads can obtain processing results from other threads through the at least one ring queue. Through the mode of the ring queue and parallel multi-thread running, the problem of image processing blockage is solved, and a delay is reduced.

In the foregoing embodiment, the vision chip 20 is disposed for the UAV 100 to obtain the obstacle avoidance measures of the UAV 100 according to the image acquired by the image collection apparatus 30. In some other embodiments, the UAV 100 may also use other controllers to implement the function of the vision chip 20.

Figure 3:
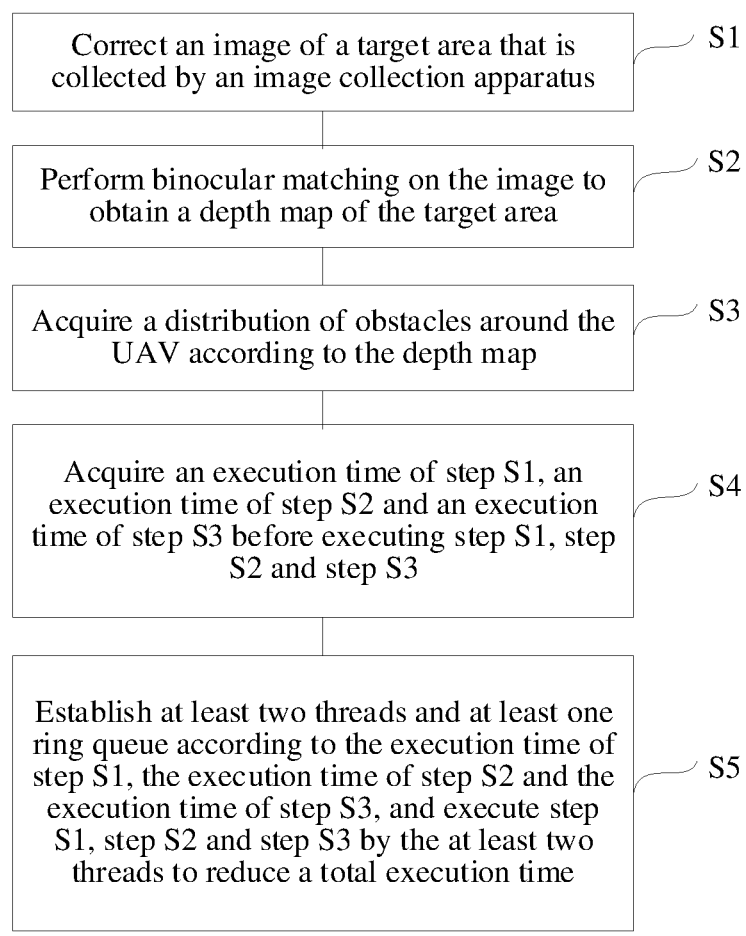
FIG. 3 is a schematic flowchart of an embodiment of the method for processing a depth map according to the present invention.

FIG. 3 is a schematic flowchart of a method for processing a depth map according to an embodiment of the present invention. The method is used in the controller of the UAV 100 shown in FIG. 1 or FIG. 2. In some of the embodiments, the controller may be the vision chip 20 of the UAV 100. As shown in FIG. 3, the method includes the following steps.

S1: Correct an image of a target area that is collected by the image collection apparatus.

The image collection apparatus may be a binocular unit, and the correcting an image collected by the image collection apparatus includes correcting the image and calibrating each set of images collected by the binocular unit to acquire calibration parameters corresponding to each set of images.

S2: Perform binocular matching on the image to obtain a depth map of the target area.

That is, binocular matching is performed on each set of images to acquire a disparity map corresponding to each set of images, and depth information of an area corresponding to each set of images is acquired according to the disparity map and the calibration parameters.

S3: Acquire a distribution of obstacles around the UAV according to the depth map.

Data processing is performed according to the depth map to obtain the distribution of obstacles around the UAV, where the distribution of obstacles is, for example, location information of the obstacles, the distances of the obstacles, a three-dimensional map of a surrounding environment of the UAV and the like.

S4: Acquire an execution time of step S1, an execution time of step S2 and an execution time of step S3 before executing step S1, step S2 and step S3.

The execution time of all of the steps may be preset by a designer based on the basic knowledge of the processing time of each step. Alternatively, step S1, step S2 and step S3 are first executed for trial operation in the controller for a period of time, and the controller detects the execution times of the steps to obtain the execution time of step S1, the execution time of step S2 and the execution time of step S3.

S5: Establish at least two threads and at least one ring queue according to the execution time of step S1, the execution time of step S2 and the execution time of step S3, and respectively execute step S1, step S2 and step S3 by the at least two threads to reduce a total execution time, where of two of the at least two threads that execute adjacent ones of the steps, a processing result from a thread executing a former step is transmitted to the ring queue, and a thread executing a latter step fetches the processing result from the ring queue and executes the latter step according to the processing result.

It is determined, according to the obtained execution time of step S1, the execution time of step S2 and the execution time of step S3, whether the at least two threads are adopted to execute step S1, step S2 and step S3 in parallel. The number of threads and ring queues may be determined according to the execution times of the above steps, for example, there may be two threads and one ring queue or three threads and two ring queues.

In some embodiments, if the total execution time of step S1, step S2 and step S3 is relatively long (for example, greater than 1000/P, where P is the image frame rate at which the image collection apparatus collects the image), image blockage may occur. In order to avoid the image blockage, at least two threads can be established to execute step S1, step S2 and step S3 in parallel. If two adjacent ones of the steps are executed by different threads, the thread executing a former step may transmit a processing result to the ring queue, and the thread executing a latter step acquires the processing result from the ring queue.

For example, the first thread, the second thread and the first ring queue may be set. The first thread executes two of step S1, step S2 and step S3, and the second thread executes one of step S1, step S2 and step S3. Alternatively, the second thread executes two of step S1, step S2 and step S3, and the first thread executes one of step S1, step S2 and step S3.

For example, the first thread executes step S1 and step S2, and the second thread executes step S3. The first thread transmits the processing result of step S2 to the first ring queue, and the second thread acquires the processing result from the first ring queue and executes step S3. In some other embodiments, alternatively, the first thread executes step S1, and the second thread executes step S2 and step S3, and so on.

Assuming that the execution time of step S1 is t1, the execution time of step S2 is t2 and the execution time of step S3 is t3, if t1+t2+t3>1000/P, t1+t2<1000/P and t3<1000/P, the first thread executes step S1 and step S2, and the second thread executes step S3. After the two threads execute step S1, step S2 and step S3 in parallel, the total execution time max(t1+t2, t3)<1000/P, which reduces the total execution time, effectively avoiding image blockage.

In some embodiments, if a thread executes two adjacent ones of the steps, and the total execution time of the two steps is still relatively large (for example, greater than 1000/P), in order to further avoid image blockage, the two steps may also be executed separately by two threads.

For example, the first thread executes steps S1 and S2, and the second thread executes step S3. If t1+t2>1000/P and t3<1000/P, then a third thread and a second ring queue can be established. The second thread executes step S1, the third thread executes step S2, the first thread transmits the processing result of step S1 to a second ring queue, and the third thread fetches the processing result from the second ring queue and executes step S2. In some other embodiments, alternatively, the third thread executes step S1, and the first thread executes step S2.

In some other embodiments, if the execution time of one of step S1, step S2 and step S3 is relatively long, for example, t3>1000/P, two or more threads may be further adopted to execute step S3.

In practical application, a plurality of sets of binocular units are usually adopted for depth detection, and the image binocular matching takes a long time. In some embodiments, in order to increase the operating speed, the binocular matching may be performed by a hardware acceleration channel disposed in the controller. The hardware acceleration channel is an apparatus composed of hardware and interface software that can increase the operating speed of the software.

In some of the embodiments, a hardware acceleration channel may be used to increase the operating speed. Each set of images consecutively captured by the at least two sets of binocular units are sequentially transmitted to the hardware acceleration channel, and each set of images are processed by performing time division multiplexing on the hardware acceleration channel, so as to obtain depth information corresponding to each set of images. That is, a first set of images are transmitted to the hardware acceleration channel for processing, and upon completion of the processing, a second set of images are transmitted to the hardware acceleration channel for processing, and so on. The hardware acceleration channel is multiplexed by polling.

In some other embodiments, at least two hardware acceleration channels may be used to increase the operating speed. In the set of images obtained by the binocular units, binocular matching processing is performed, by using a hardware acceleration channel, on the set of images obtained by the high-resolution binocular unit and the set of images obtained by the low-resolution binocular unit, to further increase the operating speed.

In some other embodiments, the set of images obtained by one high-resolution binocular unit may also be processed by using a hardware acceleration channel, and the set of images obtained by at least two low-resolution binocular units (for example, two binocular units or three binocular units) are processed by using the same hardware acceleration channel. The set of images obtained by at least two low-resolution binocular units share a hardware acceleration channel, which can make full and reasonable use of the hardware acceleration channel without affecting the operating speed of the software when the number of hardware acceleration channels is small. When the set of images obtained by at least two binocular units share one hardware acceleration channel, the sets of target images may be processed by using a method of performing time division multiplexing on the hardware acceleration channel.

Figure 4:
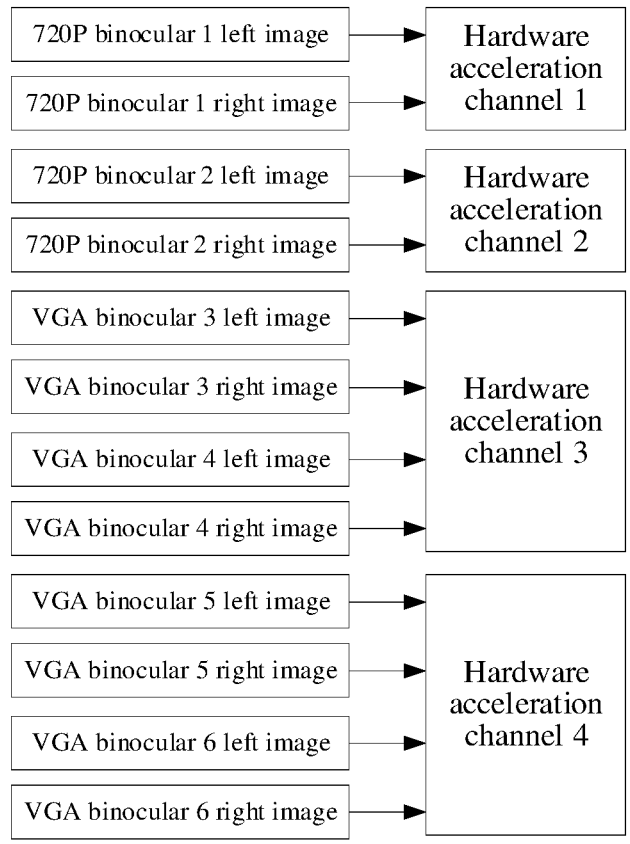
FIG. 4 is a schematic diagram of applying hardware acceleration channels in an embodiment of the method for processing a depth map according to the present invention.

For example below, an implementation of a UAV includes two pairs of binocular units having a resolution of 720P and four pairs of binocular units having a resolution of VGA, and there are four hardware acceleration channels in the controller. During specific implementation, as shown in FIG. 4, a high-resolution 720P binocular unit may use one hardware acceleration channel alone, and every two binocular units in the low-resolution VGA binocular unit share one hardware acceleration channel. A correspondence between the binocular unit and the hardware acceleration channel may be set in advance, so that the set of images obtained by each binocular unit can be transmitted to the corresponding hardware acceleration channel for processing.

Figure 5:
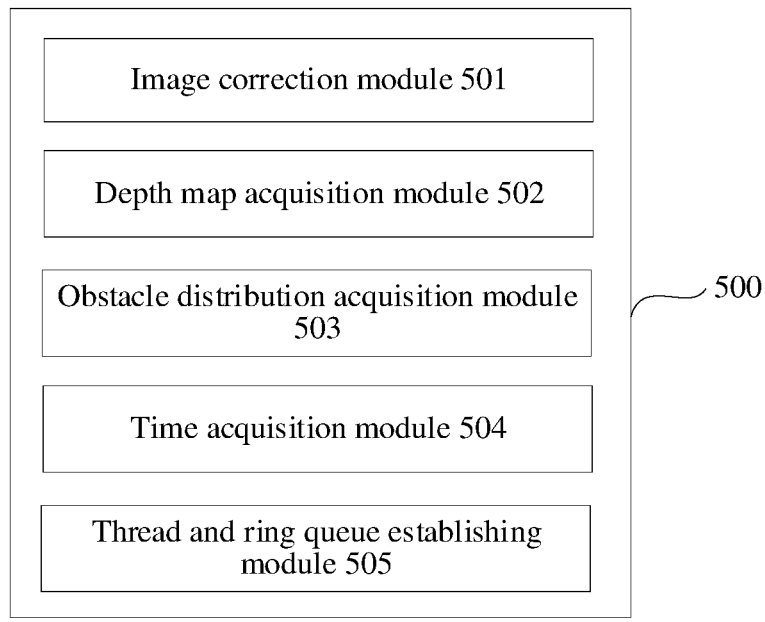
FIG. 5 is a schematic structural diagram of an embodiment of the apparatus for processing a depth map according to the present invention.

Correspondingly, as shown in FIG. 5, an embodiment of the present invention further provides an apparatus 500 for processing a depth map. The apparatus is used in the controller of the UAV 100 shown in FIG. 1 or FIG. 2. In some of the embodiments, the controller may be the vision chip 20 of the UAV 100. As shown in FIG. 5, the apparatus 500 for processing a depth map includes:

an image correction module 501, configured to execute step S1 of correcting an image of a target area that is collected by the image collection apparatus;

a depth map acquisition module 502, configured to execute step S2 of performing binocular matching on the image, so as to obtain a depth map of the target area; and an obstacle distribution acquisition module 503, configured to execute step S3 of acquiring a distribution of obstacles around the UAV according to the depth map.

The apparatus further includes:

a time acquisition module 504, configured to acquire an execution time of step S1, an execution time of step S2 and an execution time of step S3 before the execution of step S1, step S2 and step S3; and a thread and ring queue establishing module 505, configured to establish at least two threads and at least one ring queue according to the execution time of step S1, the execution time of step S2 and the execution time of step S3, and execute step S1, step S2 and step S3 by the at least two threads to reduce a total execution time, where of two of the at least two threads that execute adjacent ones of the steps, a processing result from a thread executing a former step is transmitted to the ring queue, and a thread executing a latter step fetches the processing result from the ring queue and executes the latter step according to the processing result.

In the embodiments of the present invention, at least two threads and at least one ring queue are established according to the execution times of all steps during depth map processing by the controller of the UAV, and the at least two threads execute all of the steps for processing the depth map. Each of the threads can obtain processing results from other threads through the at least one ring queue. Through the mode of the ring queue and parallel multi-thread running, the problem of image processing blockage is solved, and a delay is reduced.

Figure 6:
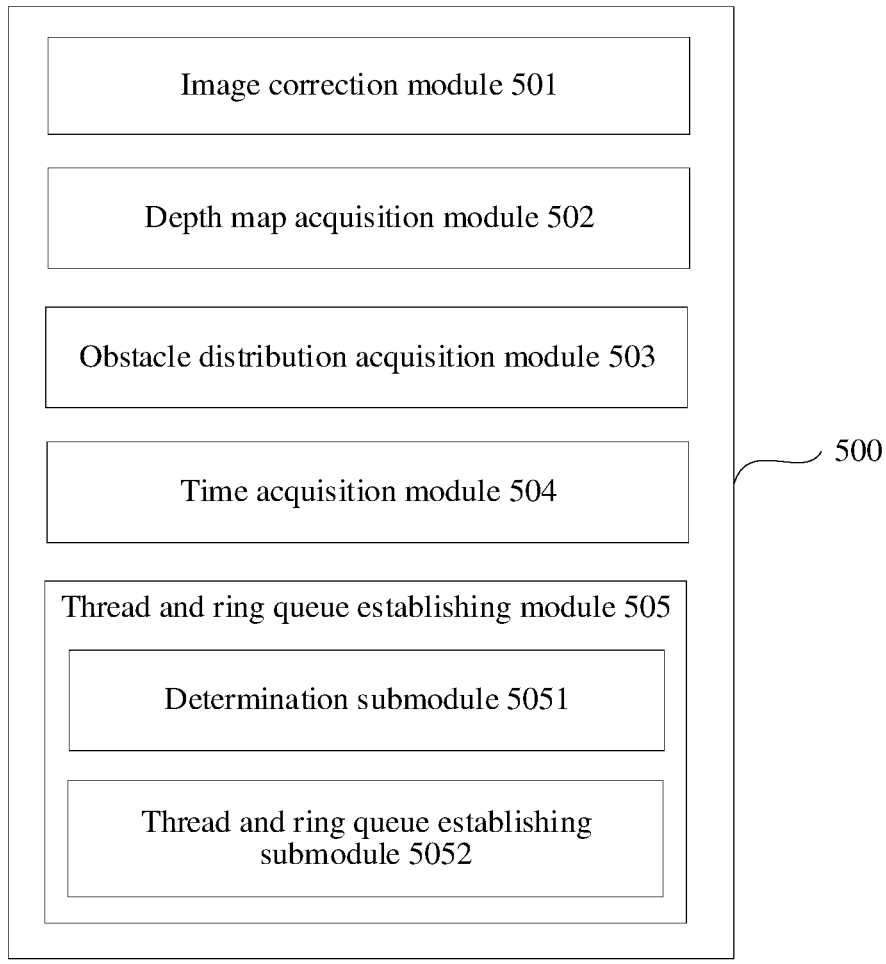
FIG. 6 is a schematic structural diagram of an embodiment of the apparatus for processing a depth map according to the present invention.

In some embodiments of the apparatus 500 for processing a depth map, as shown in FIG. 6, the thread and ring queue establishing module 505 includes:

a determination submodule 5051, configured to determine whether a sum of the execution times of step S1, step S2 and step S3 meets a first preset condition; and a thread and ring queue establishing submodule 5052, configured to establish a first thread, a second thread and a first ring queue, and execute step S1, step S2 and step S3 by the first thread and the second thread if the sum of the execution time of step S1, the execution time of step S2 and the execution time of step S3 meets a first preset condition, where of the first thread and the second thread, a processing result from a thread executing a former step is transmitted to the first ring queue, and a thread executing a latter step fetches the processing result from the first ring queue and executes the latter step according to the processing result.

In some embodiments of the apparatus 500 for processing a depth map, the first preset condition is that:

the sum of the execution time of step S1, the execution time of step S2 and the execution time of step S3 is greater than a preset value.

In some embodiments of the apparatus 500 for processing a depth map, the preset value is 1000/P, P being an image frame rate.

In some embodiments of the apparatus 500 for processing a depth map, the first thread executes two of step S1, step S2 and step S3, and the second thread executes one of step S1, step S2 and step S3.

The thread and ring queue establishing submodule 5052 is further configured to:

determine whether a sum of the execution times of the two steps executed by the first thread meets a second preset condition; and if so, establish a third thread and a second ring queue, and execute the two steps respectively by the first thread and the third thread, where of the first thread and the third thread, a processing result from a thread executing a former step is transmitted to the second ring queue, and a thread executing a latter step fetches the processing result from the second ring queue and executes the latter step according to the processing result.

In some embodiments of the apparatus 500 for processing a depth map, the second preset condition is that a sum of the execution times of the two steps executed by the first thread is greater than a preset value.

In some embodiments of the apparatus 500 for processing a depth map, the preset value is 1000/P, P being an image frame rate.

In some embodiments of the apparatus 500 for processing a depth map, the controller includes a hardware acceleration channel, and the image collection apparatus includes at least two sets of binocular units; and the depth map acquisition module 502 is further configured to:

transmit images collected by the at least two sets of binocular units to the hardware acceleration channel, and perform, by performing time division multiplexing on the hardware acceleration channel, binocular matching on the images collected by the at least two sets of binocular units, to obtain the depth map.

In some embodiments of the apparatus 500 for processing a depth map, the hardware acceleration channel includes at least two hardware acceleration channels, and the images collected by the at least two sets of binocular units include a set of images having a first resolution and a set of images having a second resolution, the second resolution being greater than the first resolution; and the depth map acquisition module 502 is further configured to:

transmit the set of images having the second resolution to one of the at least two hardware acceleration channels for binocular matching, so as to obtain a depth map corresponding to the set of images; and transmit the set of images having the first resolution to the other of the at least two hardware acceleration channels for binocular matching, so as to obtain a depth map corresponding to the set of images.

In some embodiments of the apparatus 500 for processing a depth map, the hardware acceleration channel includes four hardware acceleration channels, i.e., a first hardware acceleration channel, a second hardware acceleration channel, a third hardware acceleration channel and a fourth hardware acceleration channel, respectively;

the image collection apparatus includes six sets of binocular units, a set of images collected by four of the six sets of binocular units being the set of images having the first resolution, and a set of images collected by two of the six sets of binocular units being the set of images having the second resolution;

the depth map acquisition module 502 is further configured to:

transmit the set of images collected by the two sets of binocular units respectively to the first hardware acceleration channel and the second hardware acceleration channel; and transmit a set of images collected by two of the four sets of binocular units to the third hardware acceleration channel, and transmit a set of images collected by the remaining two of the four sets of binocular units to the fourth hardware acceleration channel.

The foregoing apparatus may perform the method provided in the embodiments of this application, and has the corresponding functional modules for performing the method and beneficial effects thereof. For technical details not described in detail in the apparatus embodiment, reference may be made to the method provided in the embodiments of this application.

Figure 7:
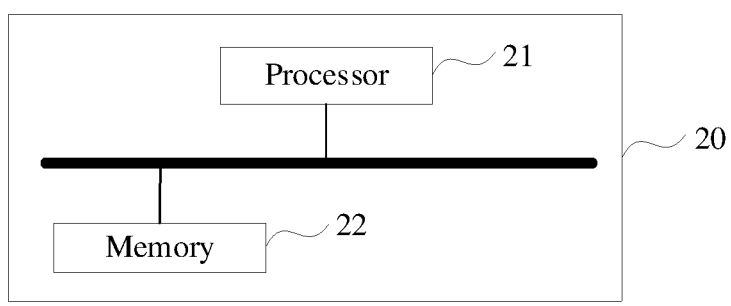
FIG. 7 is a schematic structural diagram of hardware of a vision chip in an embodiment of the UAV according to the present invention.

FIG. 7 is a schematic structural diagram of hardware of a vision chip 20 in an embodiment of the UAV 100. As shown in FIG. 7, the vision chip 20 includes:

one or more processors 21 and a memory 22. One processor 21 is used as an example in FIG. 7.

The processor 21 and the memory 22 may be connected through a bus or in other manners and are, for example, connected through a bus in FIG. 7.

As a non-volatile computer-readable storage medium, the memory 22 may be configured to store a non-volatile software program, a non-volatile computer-executable program and module, for example, a program instruction/module (for example, the image correction module 501, the depth map acquisition module 502, the obstacle distribution acquisition module 503, the time acquisition module 504 and the thread and ring queue establishing module 505 shown in FIG. 5) corresponding to the method for processing a depth map in the embodiments of the present application. The processor 21 executes various functional applications and data processing of the UAV by executing the non-volatile software program, instructions and the module stored in the memory 22, to implement the method for processing a depth map in the foregoing method embodiment.

The memory 22 may include a program storage area and a data storage area. The program storage area may store an operating system and an application program that is required by at least one function. The data storage area may store data created according to use of the vision chip, and the like. In addition, the memory 22 may include a high speed random access memory, and may also include a non-volatile memory such as at least one magnetic disk storage device, a flash memory, or another non-volatile solid-state storage device. In some embodiments, the memory 22 optionally includes memories remotely disposed relative to the processor 21, and these remote memories may be connected to the UAV by using a network. Examples of the network include, but are not limited to, the Internet, an intranet, a local area network, a mobile communication network, and a combination thereof.

The one or more modules are stored in the memory 22. When executed by the one or more processors 21, the method for processing a depth map in any of the above method embodiments is executed. For example, the above method steps 101-105 in FIG. 3 are executed, and functions of the modules 501-505 in FIG. 5 and the modules 501-505 and 5051-5052 in FIG. 6 are implemented.

The foregoing product may perform the method provided in the embodiments of the present application, and have the corresponding functional modules for performing the method and beneficial effects thereof. For technical details not described in detail in this embodiment, refer to the method provided in the embodiments of the present application.

An embodiment of the present application provides a non-transitory computer-readable storage medium storing computer-executable instructions that are executed by one or more processors, for example, the processor 21 in FIG. 7, so that the one or more processors may execute the method for processing a depth map in any of the foregoing method embodiments, for example, execute step 101 to step 105 in the foregoing method in FIG. 3, and implement functions of the modules 501-505 in FIG. 5 and the modules 501-505 and 5051-5052 in FIG. 6.

The foregoing described device embodiments are merely examples. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may be a magnetic disk, an optical disc, a read-only memory (ROM), a random access memory (RAM), or the like.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for processing a depth map, applicable to a controller of an unmanned aerial vehicle (UAV), the UAV further comprising an image collection apparatus, the image collection apparatus being communicatively connected to the controller, the method comprising the following steps:

S1: correcting an image of a target area that is collected by the image collection apparatus;

S2: obtaining a depth map of the target area by performing binocular matching on the image; and S3: acquiring a distribution of obstacles around the UAV according to the depth map; and the method further comprising:

acquiring an execution time of step S1, an execution time of step S2 and an execution time of step S3 before executing step S1, step S2 and step S3; and reducing a total execution time by establishing at least two threads and at least one ring queue according to the execution time of step S1, the execution time of step S2 and the execution time of step S3, and executing step S1, step S2 and step S3 by the at least two threads, wherein of two of the at least two threads that execute adjacent ones of the steps, a processing result from a thread executing a former step is transmitted to the ring queue, and a thread executing a latter step fetches the processing result from the ring queue and executes the latter step according to the processing result;

determining whether a sum of the execution time of step S1, the execution time of step S2 and the execution time of step S3 meets a first preset condition; and when the sum of the execution time of step S1, the execution time of step S2 and the execution time of step S3 meets the first preset condition, establishing a first thread, a second thread and a first ring queue, and executing step S1, step S2 and step S3 by the first thread and the second thread; wherein of the first thread and the second thread, a processing result from the first thread executing a former step is transmitted to the first ring queue, and the second thread executing a latter step fetches the processing result from the first ring queue and executes the latter step according to the processing result.

2. The method according to claim 1, wherein the first preset condition is that:

the sum of the execution time of step S1, the execution time of step S2 and the execution time of step S3 is greater than a preset value.

3. The method according to claim 2, wherein the preset value is 1000/P, P being an image frame rate.

4. The method according to claim 3, wherein the first thread executes two of step S1, step S2 and step S3, and the second thread executes one of step S1, step S2 and step S3; and when the sum of the execution time of step S1, the execution time of step S2 and the execution time of step S3 meets the first preset condition, the establishing a first thread, a second thread and a first ring queue, and executing step S1, step S2 and step S3 by the first thread and the second thread comprises:

determining whether a sum of the execution times of the two steps executed by the first thread meets a second preset condition; and when the sum of the execution times of the two steps executed by the first thread meets a second preset condition, establishing a third thread and a second ring queue, and executing the two steps respectively by the first thread and the third thread, wherein of the first thread and the third thread, a processing result from the first thread executing a former step is transmitted to the second ring queue, and the third thread executing a latter step fetches the processing result from the second ring queue and executes the latter step according to the processing result.

5. The method according to claim 4, wherein the second preset condition is that a sum of the execution times of the two steps executed by the first thread is greater than a preset value.

6. The method according to claim 5, wherein the preset value is 1000/P, P being an image frame rate.

7. The method according to claim 1, wherein the controller comprises a hardware acceleration channel, and the image collection apparatus comprises at least two sets of binocular units; and obtaining a depth map of the target area by performing binocular matching on the image to comprises:

obtaining the depth map by transmitting images collected by the at least two sets of binocular units to the hardware acceleration channel, and performing, by performing time division multiplexing on the hardware acceleration channel intended for binocular matching on the images collected by the at least two sets of binocular units.

8. The method according to claim 7, wherein the hardware acceleration channel comprises at least two hardware acceleration channels, and the images collected by the at least two sets of binocular units comprise a set of images having a first resolution and a set of images having a second resolution, the second resolution being greater than the first resolution; and the obtaining a depth map of the target area by performing binocular matching on the image comprises:

obtaining a depth map corresponding to the set of images by transmitting the set of images having the second resolution to one of the at least two hardware acceleration channels intended for binocular matching; and obtaining a depth map corresponding to the set of images by transmitting the set of images having the first resolution to the other of the at least two hardware acceleration channels intended for binocular matching.

9. The method according to claim 8, wherein the hardware acceleration channel comprises four hardware acceleration channels, i.e., a first hardware acceleration channel, a second hardware acceleration channel, a third hardware acceleration channel and a fourth hardware acceleration channel, respectively;

the image collection apparatus comprises six sets of binocular units, a set of images collected by four of the six sets of binocular units being the set of images having the first resolution, and a set of images collected by two of the six sets of binocular units being the set of images having the second resolution;

obtaining a depth map corresponding to the set of images the transmitting the set of images having the first resolution to the other of the at least two hardware acceleration channels intended for binocular matching comprises:

transmitting the set of images collected by the two sets of binocular units respectively to the first hardware acceleration channel and the second hardware acceleration channel; and the obtaining a depth map corresponding to the set of images by transmitting the set of images having the second resolution to one of the at least two hardware acceleration channels intended for binocular matching, comprises:

transmitting a set of images collected by two of the four sets of binocular units to the third hardware acceleration channel, and transmitting a set of images collected by a remaining two of the four sets of binocular units to the fourth hardware acceleration channel.

10. The apparatus according to claim 9, wherein the first preset condition is that:

the sum of the execution time of step S1, the execution time of step S2 and the execution time of step S3 is greater than a preset value.

11. The apparatus according to claim 10, wherein the preset value is 1000/P, P being an image frame rate.

12. The apparatus according to claim 9, wherein the first thread executes two of step S1, step S2 and step S3, and the second thread executes one of step S1, step S2 and step S3; and the processor is further configured to:

determine whether a sum of the execution times of the two steps executed by the first thread meets a second preset condition; and when the sum of the execution times of the two steps executed by the first thread meets a second preset condition, establish a third thread and a second ring queue, and execute the two steps respectively by the first thread and the third thread, wherein of the first thread and the third thread, a processing result from the first thread executing a former step is transmitted to the second ring queue, and the third thread executing a latter step fetches the processing result from the second ring queue and executes the latter step according to the processing result.

13. The apparatus according to claim 12, wherein the second preset condition is that a sum of the execution times of the two steps executed by the first thread is greater than a preset value.

14. The apparatus according to claim 13, wherein the preset value is 1000/P, P being an image frame rate.

15. The apparatus according to claim 9, wherein the hardware acceleration channel comprises at least two hardware acceleration channels, and the images collected by the at least two sets of binocular units comprise a set of images having a first resolution and a set of images having a second resolution, the second resolution being greater than the first resolution; and the processor is further configured to:
obtain a depth map corresponding to the set of images by transmitting the set of images having the second resolution to one of the at least two hardware acceleration channels for binocular matching;
obtain a depth map corresponding to the set of images by transmitting the set of images having the first resolution to the other of the at least two hardware acceleration channels for binocular matching.

16. The apparatus according to claim 15, wherein the hardware acceleration channel comprises four hardware acceleration channels, i.e., a first hardware acceleration channel, a second hardware acceleration channel, a third hardware acceleration channel and a fourth hardware acceleration channel, respectively;

the image collection apparatus comprises six sets of binocular units, a set of images collected by four of the six sets of binocular units being the set of images having the first resolution, and a set of images collected by two of the six sets of binocular units being the set of images having the second resolution;
the processor is further configured to:
transmit the set of images collected by the two sets of binocular units respectively to the first hardware acceleration channel and the second hardware acceleration channel; and
transmit a set of images collected by two of the four of the six sets of binocular units to the third hardware acceleration channel, and transmit a set of images collected by the remaining two of the four of the six sets of binocular units to the fourth hardware acceleration channel.

17. An apparatus for processing a depth map, applied to a controller of a UAV, the UAV further comprising an image collection apparatus, the image collection apparatus being communicatively connected to the controller, the apparatus comprising:

a memory, configured to store a computer-executable depth map processing method program; and
a processor, configured to invoke the computer-executable depth map processing method program to:
execute step S1 of correcting an image of a target area that is collected by the image collection apparatus;
execute step S2 of performing binocular matching on the image intended to obtain a depth map of the target area; and
execute step S3 of acquiring a distribution of obstacles around the UAV according to the depth map, wherein the processor is further configured to: acquire an execution time of step S1, an execution time of step S2 and an execution time of step S3 before the execution of step S1, step S2 and step S3; and
reduce a total execution time by establishing at least two threads and at least one ring queue according to the execution time of step S1, the execution time of step S2 and the execution time of step S3, and execute step S1, step S2 and step S3 by the at least two threads, wherein
of two of the at least two threads that execute adjacent ones of the steps, a processing result from a thread executing a former step is transmitted to the ring queue, and a thread executing a latter step fetches the processing result from the ring queue and executes the latter step according to the processing result;
determine whether a sum of the execution time of step S1, the execution time of step S2 and the execution time of step S3 meets a first preset condition; and
establish a first thread, a second thread and a first ring queue, and execute step S1, step S2 and step S3 by the first thread and the second thread when the sum of the execution time of step S1, the execution time of step S2 and the execution time of step S3 meets a first preset condition, wherein
of the first thread and the second thread, a processing result from the firstthread executing a former step is transmitted to the first ring queue, and the second thread executing a latter step fetches the processing result from the first ring queue and executes the latter step according to the processing result.

18. The apparatus according to claim 17, wherein the controller comprises a hardware acceleration channel, and the image collection apparatus comprises at least two sets of binocular units; and the processor is further configured to:
transmit images collected by the at least two sets of binocular units to the hardware acceleration channel, and perform, by performing time division multiplexing on the hardware acceleration channel, binocular matching on the images collected by the at least two sets of binocular units, to obtain the depth map.

19. A UAV, comprising:
a fuselage;
a wing connected to the fuselage;
a power apparatus disposed on the wing;
an image collection apparatus disposed on the fuselage, the image collection apparatus being configured to acquire a target image of a target area of the UAV; and
a vision chip disposed in the fuselage, the vision chip being communicatively connected to the image collection apparatus, wherein
the vision chip comprises:
at least one processor; and
a memory communicatively connected to the at least one processor, the memory storing instructions executable by the at least one processor, the instructions, when executed by the at least one processor, causing the at least one processor to execute the following steps:
S1: correcting an image of a target area that is collected by the image collection apparatus;
S2: obtaining a depth map of the target area by performing binocular matching on the image to; and
S3: acquiring a distribution of obstacles around the UAV according to the depth map;
acquiring an execution time of step S1, an execution time of step S2 and an execution time of step S3 before executing step S1, step S2 and step S3; and reducing a total execution time by establishing at least two threads and at least one ring queue according to the execution time of step S1, the execution time of step S2 and the execution time of step S3, and executing step S1, step S2 and step S3 by the at least two threads, wherein of two of the at least two threads that execute adjacent ones of the steps, a processing result from a thread executing a former step is transmitted to the ring queue, and a thread executing a latter step fetches the processing result from the ring queue and executes the latter step according to the processing result;

determining whether a sum of the execution time of step S1, the execution time of step S2 and the execution time of step S3 meets a first preset condition; and when the sum of the execution time of step S1, the execution time of step S2 and the execution time of step S3 meets the first preset condition, establishing a first thread, a second thread and a first ring queue, and executing step S1, step S2 and step S3 by the first thread and the second thread; wherein of the first thread and the second thread, a processing result from the first thread executing a former step is transmitted to the first ring queue, and the second thread executing a latter step fetches the processing result from the first ring queue and executes the latter step according to the processing result.

20. A non-transitory computer-readable storage medium, wherein the computer-readable storage medium stores computer-executable instructions which, when executed by a UAV, cause the UAV to execute the following steps:

S1: correcting an image of a target area that is collected by the image collection apparatus;

S2: obtaining a depth map of the target area by performing binocular matching on the image to; and S3: acquiring a distribution of obstacles around the UAV according to the depth map;

acquiring an execution time of step S1, an execution time of step S2 and an execution time of step S3 before executing step S1, step S2 and step S3; and reducing a total execution time by establishing at least two threads and at least one ring queue according to the execution time of step S1, the execution time of step S2 and the execution time of step S3, and executing step S1, step S2 and step S3 by the at least two threads, wherein of two of the at least two threads that execute adjacent ones of the steps, a processing result from a thread executing a former step is transmitted to the ring queue, and a thread executing a latter step fetches the processing result from the ring queue and executes the latter step according to the processing result;

determining whether a sum of the execution time of step S1, the execution time of step S2 and the execution time of step S3 meets a first preset condition; and when the sum of the execution time of step S1, the execution time of step S2 and the execution time of step S3 meets the first preset condition, establishing a first thread, a second thread and a first ring queue, and executing step S1, step S2 and step S3 by the first thread and the second thread; wherein of the first thread and the second thread, a processing result from the first thread executing a former step is transmitted to the first ring queue, and the second thread executing a latter step fetches the processing.

* * * * *